Dec. 31, 1946. W. G. MARTIN 2,413,639
METHOD OF ASSEMBLING CONTAINERS
Filed April 18, 1945 2 Sheets-Sheet 1
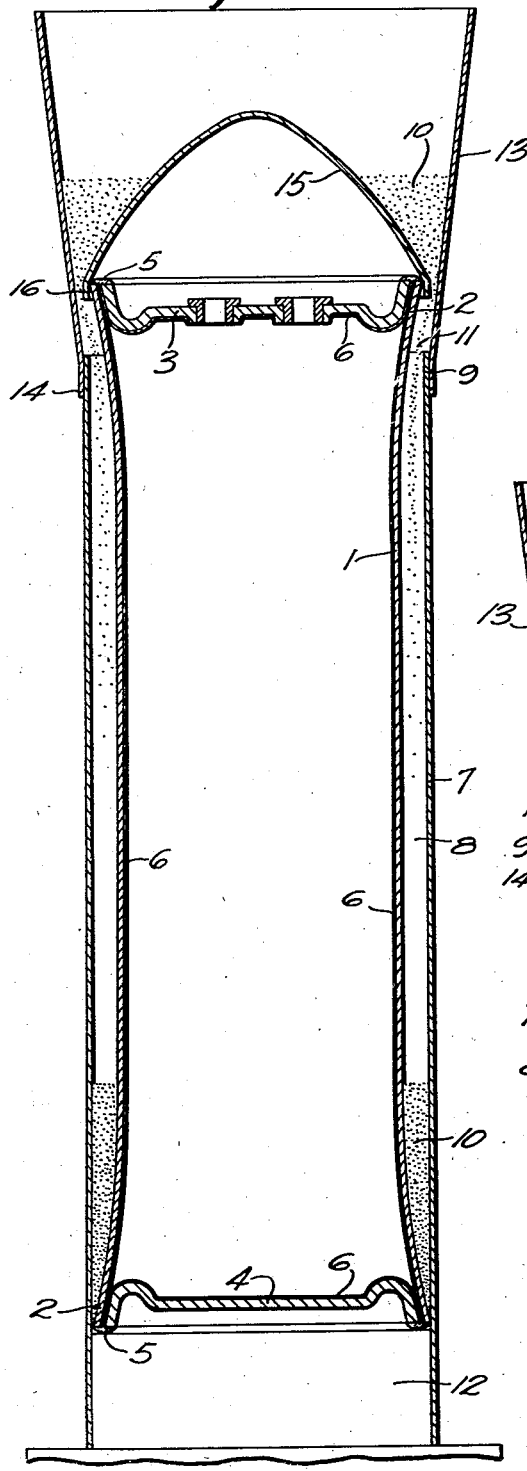
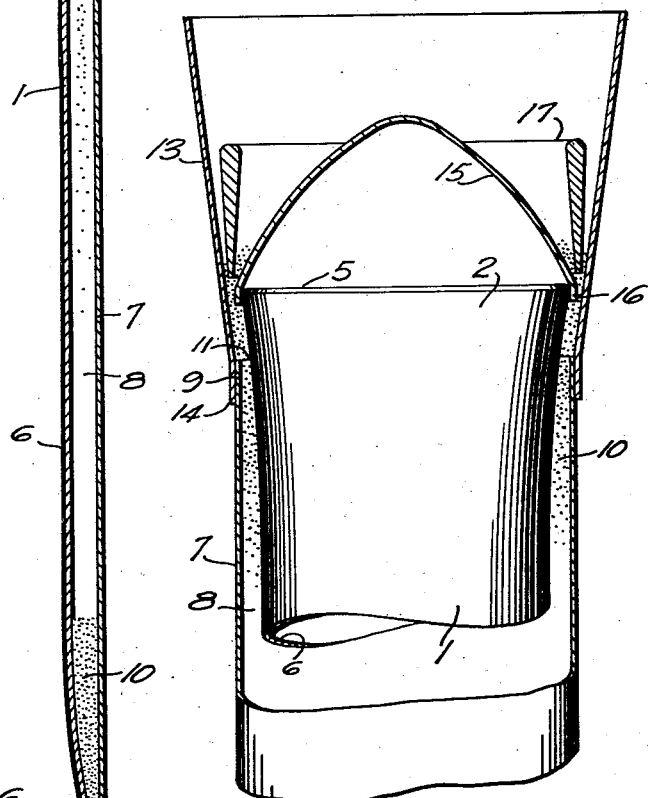
INVENTOR.
Wesley G. Martin
BY
Attorney

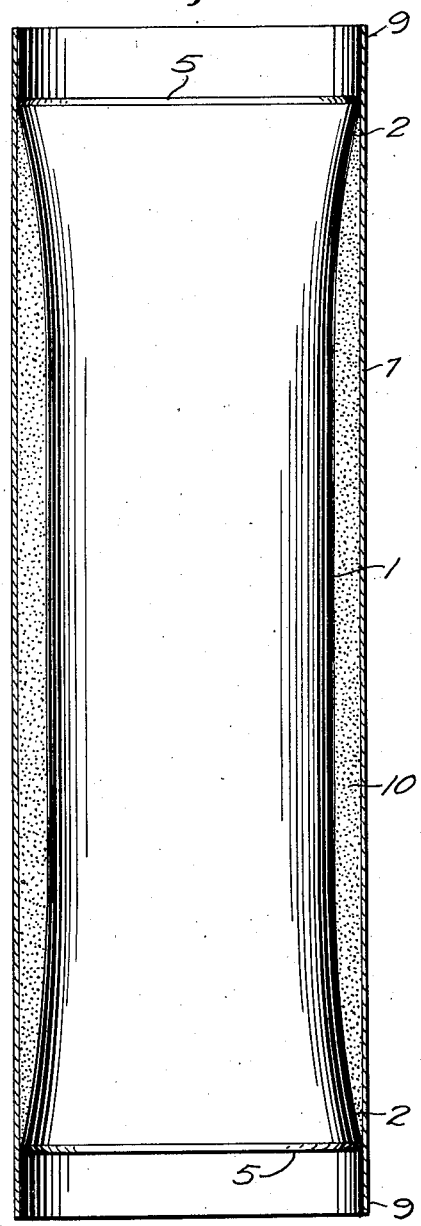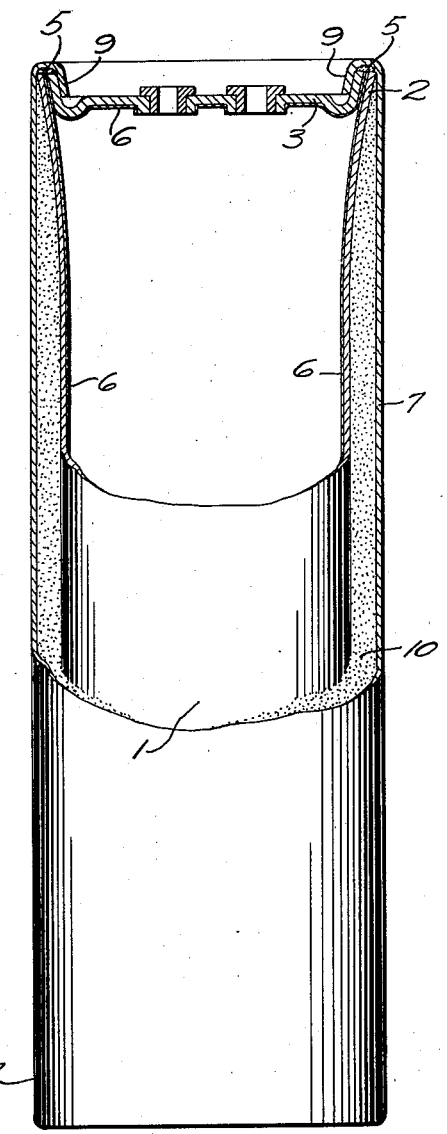

Patented Dec. 31, 1946

2,413,639

UNITED STATES PATENT OFFICE 2,413,639

METHOD OF ASSEMBLING CONTAINERS

Wesley G. Martin, Milwaukee, Wis., assignor to A. O. Smith Corporation, Milwaukee, Wis., a corporation of New York Application April 18, 1945, Serial No. 588,948

8 Claims. (Cl. 20—101)

This invention relates to a method of assembling a container such as might be employed as a water softener or the like. The invention has found particular employment in the construction of a water softener such as that disclosed and claimed in the co-pending application of William C. Heath entitled Pressure container for water softeners and the like, Serial No. 589,053, filed on April 18, 1945, and assigned to the same assignee as the present application.

The principal object of the invention is to provide a less costly method of assembling a container.

Another object is to provide a novel method of applying insulating material between the shell and casing of a water softener or the like.

Other objects and advantages of the invention appear hereinafter in connection with the description of an embodiment of the invention illustrated in the accompanying drawings.

In the drawings:

Figure 1 is a vertical sectional view of a water softener being filled with the hopper assembly of the invention;

Fig. 2 is a detail sectional view showing a tamper member to improve the density of the insulation;

Fig. 3 is a detail section showing the outer shell in position for beading over the ends of the inner tank after the insulation is in place; and Fig. 4 is a side elevation partly in section of a water softener completed in accordance with the assembly of the invention.

Referring to the drawings there is illustrated a water softener having an inner shell 1 fabricated from sheet metal and having a generally cylindrical shape with flared end portions 2.

The upper head 3 and the lower head 4 close the ends of shell 1 and are preferably of a concave-convex shape. The heads are made of metal similar to that of the shell 1. The outer end of the flared skirts of each head are joined to the end portions 2 of shell 1 by the circumferential weld 5.

The heads 3 and 4 and the shell 1 are interiorly lined throughout their entire inner surface with a protective lining 6, preferably of ceramic enamel which is applied and fused to the inner metal surfaces prior to assembly. Suitable openings and fittings may be provided in the heads for pipe connections and other attachments.

The inner shell 1 is surrounded by an outer generally cylindrical shell or casing 7 of lighter gauge metal and of greater length than the inner shell. The casing 7 surrounds and is radially spaced from shell 1 to provide a generally cylindrical space 8 therebetween. The shell or casing 7 has a diameter corresponding to the outer diameter of shell 1 at weld 5 and each end portion 9 of the outer casing 7 is preferably beaded over the respective end weld 5 of the tank to secure the outer shell in place.

The space 8 between tank shell 1 and the outer thin casing 7 is filled with a suitable insulating material 10, such as mica or the like to prevent sweating of the outer shell in service. The invention in one of its phases is directed toward the filling up of space 8 by the insulating material 10 and the final assembly of the outer shell 7 upon the tank.

In carrying out the invention illustrated in the drawings, after the inner tank formed by shell 1 and heads 3 and 4 has been fabricated and welded as described, the outer casing 7 is first disposed around the inner tank in a manner to locate the upper end of the casing at a line substantially removed downwardly from the upper end weld 5 of the tank. This provides an opening 11 between weld 5 of the inner tank and end portion 9 of the outer shell through which the insulating material 10 may be fed into space 8 between the shells.

The inner tank and outer shell may be supported on a base member 12 which holds the same in the desired relative position and substantially prevents escape of insulation from between lower weld 5 and the outer shell 7.

The insulating material employed is poured into a suitable hopper 13 which is located above the inner tank and outer shell 7. The hopper 13 is circular with a cone-shaped outer wall. The lower end 14 of the outer wall of the hopper has a diameter only slightly greater than the outer shell 7 so that the hopper 13 may be lowered to a position which will place the outer surface of upper end portion 9 of the shell inside and in overlapping contact with the inner surface of the lower end 14 of the hopper.

The hopper 13 has a central conical bottom 15 covering the tank and with a depending flange 16 at its perimeter adapted to engage the weld 5 on the inner tank.

The flange 16 and the lower end 14 of the hopper when assembled with shell 7 and the inner tank as described direct the flow of insulating material 10 from the hopper 13 through opening 11 and into space 8 between inner shell 1 and outer shell 7.

In carrying out the filling of space 8, after the hopper 13 is assembled with the shell 7 and inner tank in the manner described the insulating material 10 is poured into the hopper and flows into space 8 until the same is filled.

During the filling operation the outer shell 7 and the inner tank may be vibrated from time to time vertically or otherwise by any suitable means to settle the insulation 10 within space 8. When the filling of the space is completed an annular tamper member 17 may be inserted through the top of the hopper 13 and employed to tamp the insulation into a more compact state of maximum denseness. Additional insulating material 10 may be added and tamped if necessary, after the first tamping operation is completed.

After space 8 is filled, shell 7 is pushed longitudinally upward to the position illustrated in Fig. 3 in which the upper end portion 9 of shell 7 is disposed substantially above the upper end weld 5 of the inner tank in the same manner as the lower end portion 9 extends beyond the lower end weld 5 of the inner tank. In this movement of shell 7, the upper end of the latter engages the flange 16 and lifts the hopper upwardly and the hopper is removed after the shell 7 has been raised to the position indicated.

The respective upper and lower end portions 9 of the outer shell 7 are next spun over the welds 5 at the extreme ends of the inner tank. The spinning operation secures the outer shell 7 to the inner tank and seals the insulation 10 in space 8, substantially completing the assembly of the water softener unit.

The method of the invention provides a way in which insulation material may be readily and economically supplied in the space between the outer and inner shells of a water softener unit of the type of construction described.

Various practices may be employed within the scope of the invention as set forth in the accompanying claims.

I claim:

1. In the construction of an insulating tank wall or the like having two substantially cylindrical shells of different diameters and one of which is shorter than the other and has its ends formed toward the other when they are assembled, the method comprising disposing said shells vertically one within the other to provide a radial space therebetween for the reception of insulating material and with the upper end of the longer shell below the formed upper end of the other shell and with the lower end of the radial space between the shells substantially closed, filling said radial space with insulating material from the top, then raising the longer shell relative to the other until both are centered, and finally closing the ends of the radial space by crimping the ends of the longer shell over the corresponding ends of the other shell.

2. In the construction of an insulating tank wall or the like having two substantially cylindrical concentric shells radially spaced from one another to receive insulating material therebetween and in which the inner shell has its ends flared gradually outwardly toward the outer shell and the outer shell is longer than the inner shell, the method comprising positioning said shells relatively longitudinally with the upper end of the outer shell below the flared upper end of the inner shell and with the lower end of the radial space between the shells substantially closed, filling the radial space with insulating material from the top, then raising the outer shell relative to the inner shell until both are centered, and finally closing the ends of the radial space by crimping the ends of the outer shell inwardly over the corresponding ends of the inner shell.

3. In the construction of an insulating tank wall or the like having two substantially cylindrical concentric shells radially spaced from one another to receive insulating material therebetween and in which the inner shell has its ends flared outwardly toward the outer shell and the outer shell is longer than the inner shell, the method comprising positioning said shells relatively longitudinally with the upper end of the outer shell below the flared upper end of the inner shell and with the lower end of the radial space between the shells substantially closed, applying a hopper to the top of the shells with opposite circular walls of the hopper engaging the corresponding shells to guide the material into the space between the shells, filling the radial space between the shells with insulating material poured through the hopper, filling the hopper to a level above the inner shell, then raising the upper end of the outer shell upwardly through the insulating material and to the end of the inner shell, removing the hopper and excess insulating material, and finally securing the shells together at their corresponding ends.

4. In the construction of an insulating tank wall or the like having two substantially cylindrical shells of different diameters and one of which is shorter than the other and has its upper end gradually formed toward the other when they are assembled, the method comprising disposing said shells vertically one within the other to provide a radial space therebetween for the reception of insulating material and with the shell having the extended end dropped relative to the other to position its upper end below the formed upper end of the other shell and provide a mouth for receiving the insulating material, filling said radial space with insulating material through said mouth, then relatively moving said shells vertically to normal centered position, and crimping the extended upper end of the one shell over the formed upper end of the other shell to seal the insulation in place and secure the two shells together.

5. In the assembly of a water softener or the like having an outer shell member with a straight cylindrical wall and an inner generally cylindrical tank member with the body portion thereof spaced inwardly from said outer shell and gradually flared at the outer end portion thereof fitting within said outer shell and closed by end heads, the steps comprising assembling the flared tank member inside the straight walled shell with the flared end of the inner member longitudinally outwardly removed from the end of the straight walled member to provide a circumferential transverse opening between said ends, filling the space between the shell and tank through said opening with insulating material to protect and support the outer shell, moving the tank and shell members longitudinally relative to each other to close said opening, and then securing the members together at their end areas.

6. In the assembly of a water softener or the like having a straight walled outer shell and an inner tank shell spaced inwardly therefrom, the inner tank shell having end portions gradually flared to substantially the diameter of the outer shell, the steps comprising assembling the tank within the outer shell with the upper end of the shell disposed below the upper flared end of the tank to provide a circumferential transverse opening between the upper ends of the tank and shell, filling the space between the outer shell and tank with insulating material, through said transverse opening, moving the shell and tank relatively longitudinally until the space between the same is substantially closed at both ends by the respective flared ends of the tank, and then crimping the ends of the outer shell over the ends of the tank to secure the tank and shell together at their end areas while spaced apart throughout the body portions thereof.

7. In the assembly of a water softener or the like having a straight walled outer shell and an inner tank shell spaced inwardly therefrom, the inner tank shell having end portions flared to substantially the diameter of the outer shell, the steps comprising assembling the inner shell within the outer shell with the upper end of the outer shell disposed below the upper flared end of the inner shell to provide a circumferential transverse opening between the upper ends of the tank and shell, filling the space between the shell and tank through said opening with insulating material while vibrating the shell to settle said material solely at the entrance to said opening, tamping the material to densely pack the same in said space, moving the outer shell upwardly relative the inner shell to close the transverse opening, and then spinning the ends of the outer shell over the ends of the tank to secure the same together with the body portions thereof maintained in spaced relation.

8. In the assembly of a water softener or the like having a straight walled outer shell and an inner shell of lesser length spaced inwardly therefrom and closed by end heads to provide the same as a tank with the end portions of the inner shell flared to substantially the diameter of the outer shell, the steps comprising assembling the tank within the outer shell with the lower end of the shell disposed below the lower end of the tank to provide a circumferential transverse opening between the upper ends of the tank and shell, applying a hopper to said circular opening having a flange engaging the upper end of the tank and a lower end encircling the upper end of the outer shell, pouring insulating material into the space between the shell and tank through said hopper to fill the same, moving the outer shell upwardly to close said space, removing the hopper by the upper end of the outer shell engaging the flange of the hopper and moving the same upwardly and securing the end portions of the shell to the tank.

WESLEY G. MARTIN.